May 4, 1954 — G. BIEGERT — 2,677,313
CHANNEL FORMING MACHINE
Filed May 26, 1951 — 4 Sheets-Sheet 1
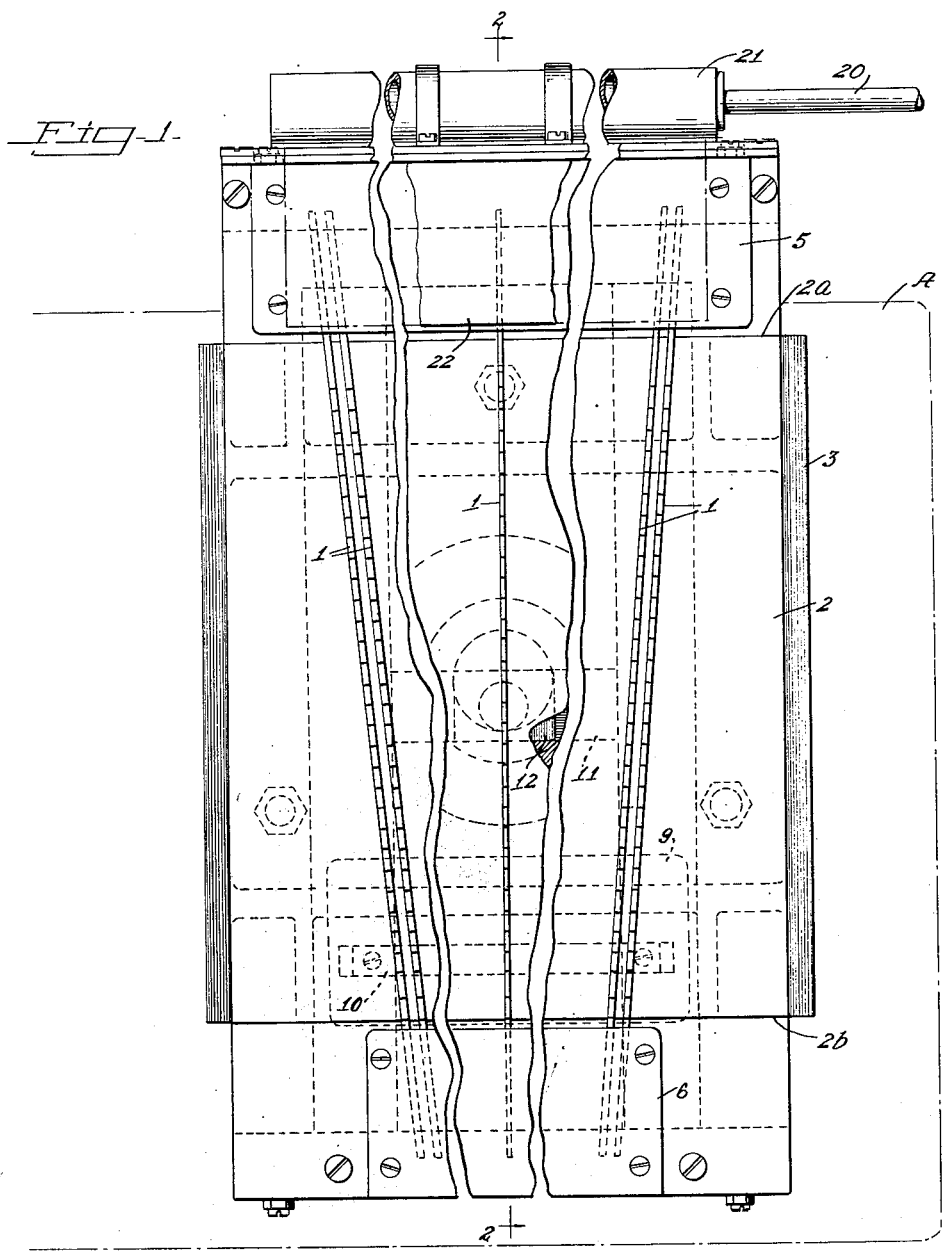
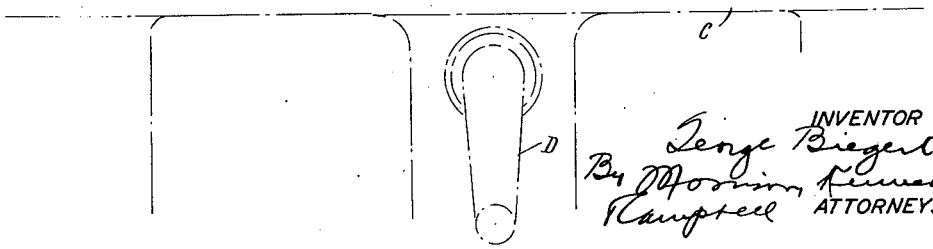

May 4, 1954

G. BIEGERT 2,677,313

CHANNEL FORMING MACHINE

Filed May 26, 1951

INVENTOR
George Biegert
ATTORNEYS

Patented May 4, 1954

2,677,313

UNITED STATES PATENT OFFICE 2,677,313

CHANNEL FORMING MACHINE

George Biegert, Elmhurst, N. Y., assignor to Mergenthaler Linotype Company, a corporation of New York Application May 26, 1951, Serial No. 228,507

3 Claims. (Cl. 90—33)

This invention relates to groove or channel forming machines, and more particularly, to machines for forming grooves or channels in the opposed plates of magazines for typographical composing machines.

In typographical composing machines, the magazines serve as the storehouses for the various character bearing matrices, usually an entire font including the necessary fixed spacers and quads. The magazine itself is generally trapezoidal in shape and consists of upper and lower plates with opposed matrix guiding channels or grooves which converge rather closely at the discharge end of the magazine. There are different types of magazines supplied commercially, but the more common magazines contain 90, 72 or 34 grooves or channels, many of which are of different widths as governed by the varying thicknesses of the guiding ears with which the matrices are provided.

Because of these characteristics of the magazine plates, viz. their trapezoidal shape and their converging matrix guiding channels of varied widths, it has been customary to form the channels in the plates one at a time. To briefly outline the procedure, the plate to be cut is first accurately positioned and clamped to a horizontal table and a selected rotary cutting blade guided by rails or tracks over the entire length of the plate to form the first channel or slot. Thereupon, the cutting blade is returned to starting position and the plate shifted and adjusted in accordance with the angle of the next channel to be cut. Generally, also, a new blade of a different thickness has to be selected and substituted for the first blade before the next cutting operation is instituted. It is evident that the number of cutting operations, as well as the intermediate steps between cutting operations, make this process unduly time consuming and expensive.

The present invention provides a machine for forming a plurality of channels in the magazine plate, feasibly even the entire bank, in a single milling operation. In accordance with this invention, the magazine plate is positioned and clamped to a movable reinforcing frame which serves to carry the plate into operative contact with a series of power driven reciprocating blades arranged at appropriate angles and of proper thicknesses to produce the required channels in the plate.

The present invention, along with other advantages and improvements thereof, will be better understood from the accompanying drawings and the detailed description which follows.

Referring to the drawings:

Fig. 1 is a front elevation showing the end portions and a middle portion, of the present machine, with the plate feeding means removed;

Figure 2:
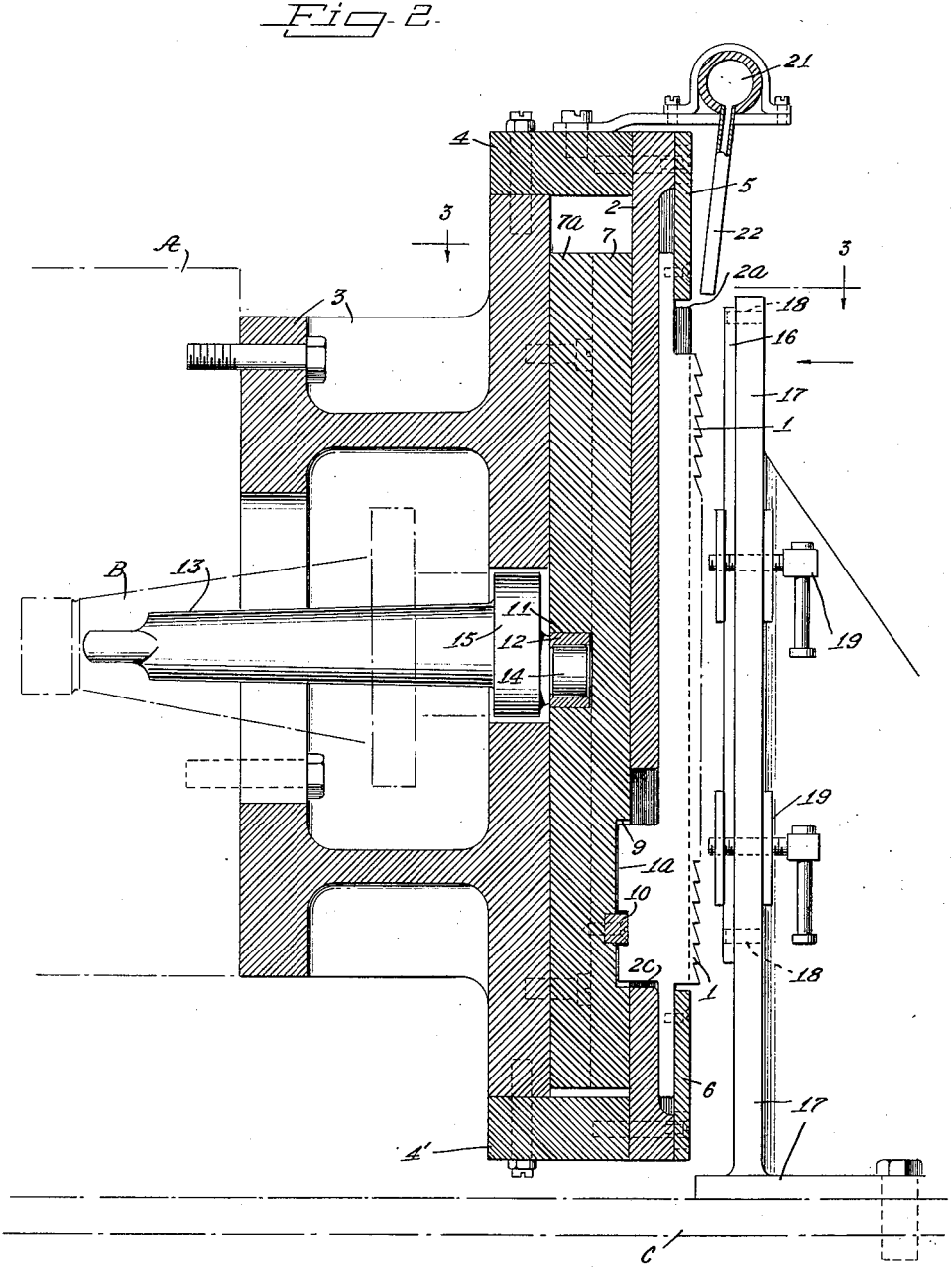
Fig. 2 is a cross-section taken along the line 2—2 of Fig. 1, looking in the direction of the arrows, but also including the plate feeding means in side elevation.

In accordance with the present invention, a plurality of reciprocable saw blades $1$ are arranged in slots or guideways of a vertically disposed frame plate 2, and the latter is connected to the front of a fixed mounting 3 by means of upper and lower horizontal crosspieces 4 and $4^1$. The mounting 3, in turn, is securely bolted to a housing A which encloses the power driving mechanism for the unit.

The guideways of the vertical frame plate 2 are arranged at appropriate angles, corresponding to the respective angles of the channels which they are intended to cut in the magazine plate. As would therefore be expected, the centrally located guideways or slots are more or less verically disposed, whereas the more remote ones, on either side, converge closely together at their lower ends. The guideways are, of course, made somewhat longer than the lengths of the saw blades to permit the reciprocation of the blades therein for cutting.

The saw blades are selected as to thickness according to the varying widths of the magazine channels to be cut. The rear edges of the blades extend beyond, both above and below, the front cutting or toothed edges and are held in place by upper and lower cover plates 5 and 6, respectively, which are removably secured to the front face of the frame 2 and fit in place over the extensions of the blades to hold them in their individual slots or guideways. In order that the cover plates can be fastened to the slotted frame 2 without unnecessary protrusion, which might otherwise interfere with the feeding of the blank plate stock material to the blades, the said frame, as best shown in Figs. 1 and 2, is provided with upper and lower recessed portions, leaving ledges $2^a$ and $2^b$.

Figure 3:
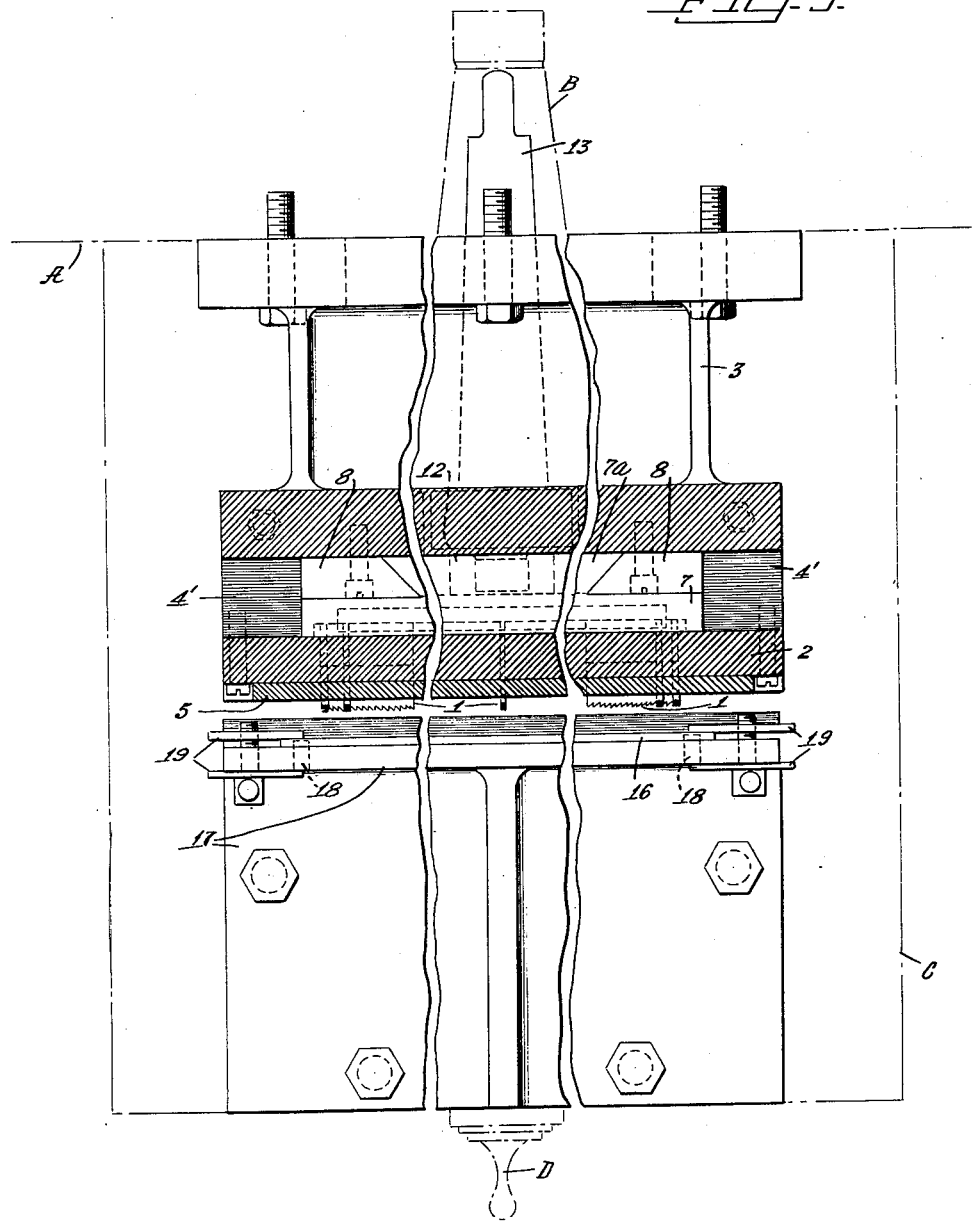
Fig. 3 is a cross-section taken along the line 3—3 of Fig. 2, looking in the direction of the arrows.

The reciprocation of the saw blades $1$ for cutting is effected from the power driving mechanism housed in the enclosure A. When the machine is in operation, an upward and downward reciprocatory motion is imparted to the blades from a movable slide 7 which, as can best be seen in Fig. 3, is provided with a rearwardly pro-projecting dove-tail 7ª which is adapted to slide up and down between vertical longitudinal dove-tail guide members 8 bolted to the front face of the mounting 3.

As shown in Fig. 2, a short length of each of the blade accommodating guideways or slots of the frame 2 is provided with an elongated opening or slit, the upper and lower ends of which are indicated by the reference character 2ᶜ, through which a rearwardly projecting portion 1ª of each of the blades extends. It is evident that these slits should be long enough to permit the full stroke of the projecting portion 1ª of the saw blade therein.

Figure 4:
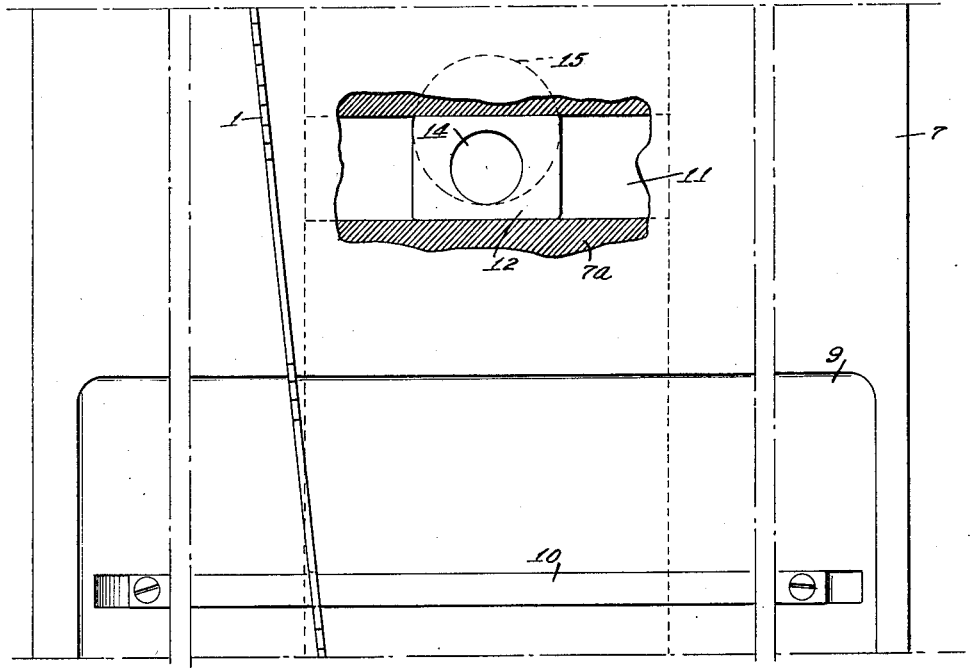
Figs. 4 and 5 are front elevational views, partly broken away, illustrating the means for transmitting power from the driving mechanism to the saw blades.
Figure 5:
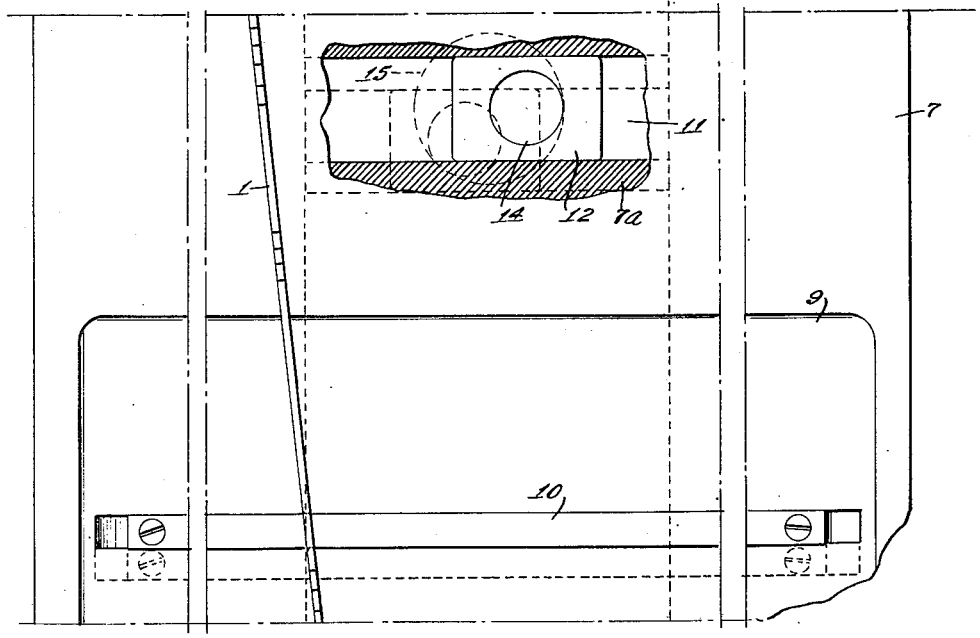

In order to accommodate the rearwardly projecting portions 1ª of the blades, the front face of the slide 7 is preferably provided with a rectangular recess 9 (see Figs. 2, 4 and 5). The saw blades, however, receive their support, as well as their movement, from a horizontal bar 10 attached to the slide and which extends across most of the recesses 9, engaging all of the blades. The rearward projections 1ª of the blades are provided with notches to receive the bar 10.

It will now be seen that the reciprocatory motion of the slide 7 is imparted to the saw blades 1 through the horizontal supporting bar 10 of the slide (see Figs. 2, 4 and 5). It might be parenthetically added at this point that, although the movement of the slide 7 is always in a straight up and down vertical direction, many of the blades travel at angles to the vertical so that there will be a sliding effect of some of the blades along the bar 10. If, therefore, the edges of the notches of the blades which are in operative contact with the bar 10 are rounded or chamfered, it will help to reduce much of the friction which might otherwise result.

Turning now to the manner in which the slide 7 is reciprocated, as best shown in Figs. 2, 4 and 5, the rear face of dove-tail tongue 7ª of the slide is provided with an open horizontal slot 11 containing a rectangular block 12 slidable therein. The block 12 is operatively connected to the driving mechanism within the housing A by means of a tapered shaft or arbor 13 which fits tightly within the inner tapered bore of a rotatable spindle adapter B through which the driving power is transmitted. The forward end of the arbor 13 is provided with an eccentric driver 14, in the form of a roller rotatably mounted on the front face of a wheel or disk 15, and said driver is rotatably fitted within said block 12. As the arbor 13 rotates, the eccentric driver 14 travels in a circular orbit about the axis of rotation of the arbor (see Fig. 5), and in so doing causes the slidable block 12 to reciprocate the slide 7 in its vertical guideways. Only the vertical upward and downward movement of the block is imparted to the slide 7, since its lateral movement is taken up by the slot 11. The operative driving connection between the eccentric driver 14 and the cutting blades 1 is clearly illustrated in Fig. 5, where the eccentric 14 and the block 12 are shown in different relative positions, one indicated by broken lines and the other by solid lines.

The magazine plate stock 16 to be cut is fed into operative contact with the reciprocating saw blades 1 by means of a plate supporting and reinforcing frame 17, the base of which is securely mounted to a horizontally movable table or bed C (Figs. 2 and 3). The movement of the bed C, toward and away from the saw blades, is controlled by a hand crank D. In order that the channels be accurately milled in the plate, it is important that the plate be properly pre-positioned against the face of the frame 17. For this purpose, the front face of the frame 17 is provided with dowels 18 which engage small holes initially drilled in the corners of the plate. Clamps 19 serve to hold the plate 16 securely against the said face of the frame 17.

When the plate 16 is thus securely positioned and clamped against the frame 17, the hand crank D is operated to advance the bed C, and hence also the frame 17 which carries the plate, toward the saw blades 1. The hand crank may be provided with a vernier or indicator to gauge the amount of the feed in order that the depth of the cut can be accurately regulated. If less than the desired number of channels has been milled in the magazine plate during the first operation, the plate can be either relocated and subjected to a second operation on the same machine, or better still, since the blades would probably have to be changed if the second operation were performed on the same machine, removed to a second machine already set up and prepared for milling another group of channels, as desired.

It should, of course, be obvious that arrangements wherein the blades are moved into operative engagement with the plate might be equally acceptable.

The saw blades 1 should be well lubricated during the cutting operation. As best shown in Figs. 1 and 2, the lubricating oil is pumped under pressure through an inlet tube 20 into a chamber 21, located above the saw blades, from whence it is directed toward the blades by a flat elongated nozzle 22.

This invention has been shown and described in preferred form, but obviously many variations and modifications may be made therein and in its mode of application which will still be comprised within its spirit. It is to be understood, therefore, that this invention is not to be limited to any specific form or embodiment, except insofar as such limitations are specified in the appended claims.

What is claimed is:

1. A machine for forming a series of angularly disposed grooves or channels simultaneously in a flat plate comprising, in combination, a plurality of reciprocable saw blades arranged in planes perpendicular to the surface of the plate to be operated upon, said blades being arranged lengthwise in angular relation to one another in accordance with the grooves to be cut, a permanent machine element presenting a corresponding series of fixed guideways in which the saw blades are slidable longitudinally, a single reciprocable slide guided for longitudinal movement in a straight line and connected to all of the blades for imparting its reciprocatory movements thereto, said connection permitting the blades to shift laterally with reference to the slide during its reciprocatory movements, and power means for continuously reciprocating the slide and the connected saw blades during each cutting operation of the machine.

2. A machine for forming a series of angularly disposed grooves or channels simultaneously in a flat plate comprising, in combination, a plurality of reciprocable saw blades arranged in planes perpendicular to the surface of the plate to be operated upon, said blades being arranged lengthwise in angular relation to one another in accordance with the grooves to be cut, a permanent machine element presenting a corresponding series of fixed guideways in which the saw blades are slidable longitudinally, and power means for continuously reciprocating the saw blades in unison in their respective guideways during each cutting operation of the machine.

3. A machine for forming a series of angularly disposed grooves or channels simultaneously in a flat plate comprising, in combination, a plurality of reciprocable saw blades arranged in planes perpendicular to the surface of the plate to be operated upon, said blades being arranged lengthwise in angular relation to one another in accordance with the grooves to be cut, a permanent machine element presenting a corresponding series of fixed guideways in which the saw blades are slidable longitudinally, and power means common to and connected to all of the saw blades for continuously reciprocating said blades in their respective guideways during each cutting operation of the machine.

References Cited in the file of this patent

UNITED STATES PATENTS

| Number | Name | Date |
|---|---|---|
| 17,823 | Harrison | July 14, 1857 |
| 2,023,911 | Boughton | Dec. 10, 1935 |
| 2,123,777 | Hart | July 12, 1938 |
| 2,150,455 | Nilsson | Mar. 14, 1939 |
| 2,177,147 | Mattson | Oct. 24, 1939 |
| 2,255,221 | La Pointe | Sept. 9, 1941 |
| 2,305,339 | Deutscher | Dec. 15, 1942 |
| 2,474,877 | Wilson | July 5, 1949 |
| 2,544,814 | Warren | Mar. 13, 1951 |